United States Patent [19]

Morehart

[11] Patent Number: 5,367,014

[45] Date of Patent: Nov. 22, 1994

[54] HIGH MODULUS LOW HYSTERESIS RUBBER COMPOUND FOR PNEUMATIC TIRES

[75] Inventor: Christine L. Morehart, North Canton, Ohio

[73] Assignee: Bridgestone/Firestone, Inc., Akron, Ohio

[21] Appl. No.: 96,846

[22] Filed: Jul. 26, 1993

Related U.S. Application Data

[63] Continuation of Ser. No. 680,497, Apr. 4, 1991, abandoned.

[51] Int. Cl.$^5$ ................................................ C08K 9/06
[52] U.S. Cl. .................................... 524/526; 524/495; 524/496; 525/99; 525/241
[58] Field of Search ................ 524/495, 526; 525/99, 525/241

[56] References Cited

U.S. PATENT DOCUMENTS

| | | | |
|---|---|---|---|
| 2,277,754 | 8/1949 | Kraft | 152/166 |
| 3,450,182 | 6/1969 | Verdier | 152/352 |
| 3,773,096 | 11/1973 | Masson | 152/361 |
| 3,873,348 | 3/1975 | Reilly et al. | 117/72 |
| 3,911,987 | 10/1975 | Takusagawa et al. | 152/354 |
| 3,949,798 | 4/1976 | Gardner et al. | 152/330 |
| 3,954,131 | 5/1976 | Hoshino et al. | 152/354 |
| 3,985,173 | 10/1976 | Masson | 152/361 |
| 4,067,372 | 1/1978 | Masson | 152/354 |
| 4,111,249 | 9/1978 | Markow | 152/330 |
| 4,202,393 | 5/1980 | Ikeda et al. | 152/330 |
| 4,203,481 | 5/1980 | Ranik, Jr. | 152/330 |
| 4,261,405 | 4/1981 | Yamauchi et al. | 152/330 |
| 4,265,288 | 5/1981 | Kaneko et al. | 152/209 |
| 4,287,924 | 9/1981 | Deck et al. | 152/153 |
| 4,365,659 | 12/1982 | Yoshida et. al. | 152/354 |
| 4,485,205 | 11/1984 | Fujimaki et al. | 524/526 |
| 4,487,892 | 12/1984 | Ohmori et al. | 525/237 |
| 4,737,535 | 4/1988 | Furukawa et al. | 524/113 |
| 4,917,164 | 4/1990 | Ushikubo et al. | 152/517 |
| 4,929,679 | 5/1990 | Akita et al. | 525/194 |
| 4,929,684 | 5/1990 | Roland et al. | 525/274 |
| 4,963,615 | 10/1990 | Yuto | 524/496 |
| 5,131,445 | 7/1992 | Tokieda et al. | 152/517 |
| 5,158,627 | 10/1992 | Saneto et al. | 152/510 |

FOREIGN PATENT DOCUMENTS

| | | |
|---|---|---|
| 83630122.6 | 2/1984 | European Pat. Off. . |
| 87104795.7 | 4/1987 | European Pat. Off. . |
| 2138367A | 4/1984 | United Kingdom . |

*Primary Examiner*—Edward Cain
*Attorney, Agent, or Firm*—Daniel N. Hall

[57] ABSTRACT

A sulfur-vulcanizable rubber compound having high modulus and low hysteresis properties. Such compounds comprise from about 0 to 65 parts by weight of polyisoprene; from about 25 to 35 parts by weight of a high styrene resin, SBR masterbatch and from about 0 to 65 parts by weight of polybutadiene to total 100 parts by weight; from about 50 to 60 parts by weight of a reinforcing filler, per 100 parts by weight of rubber and at least 5 parts by weight of sulfur, per 100 parts by weight of rubber. Pneumatic tires and components therefor are manufactured from rubber compounds having high modulus and low hysteresis and provide run flat operation.

33 Claims, 1 Drawing Sheet

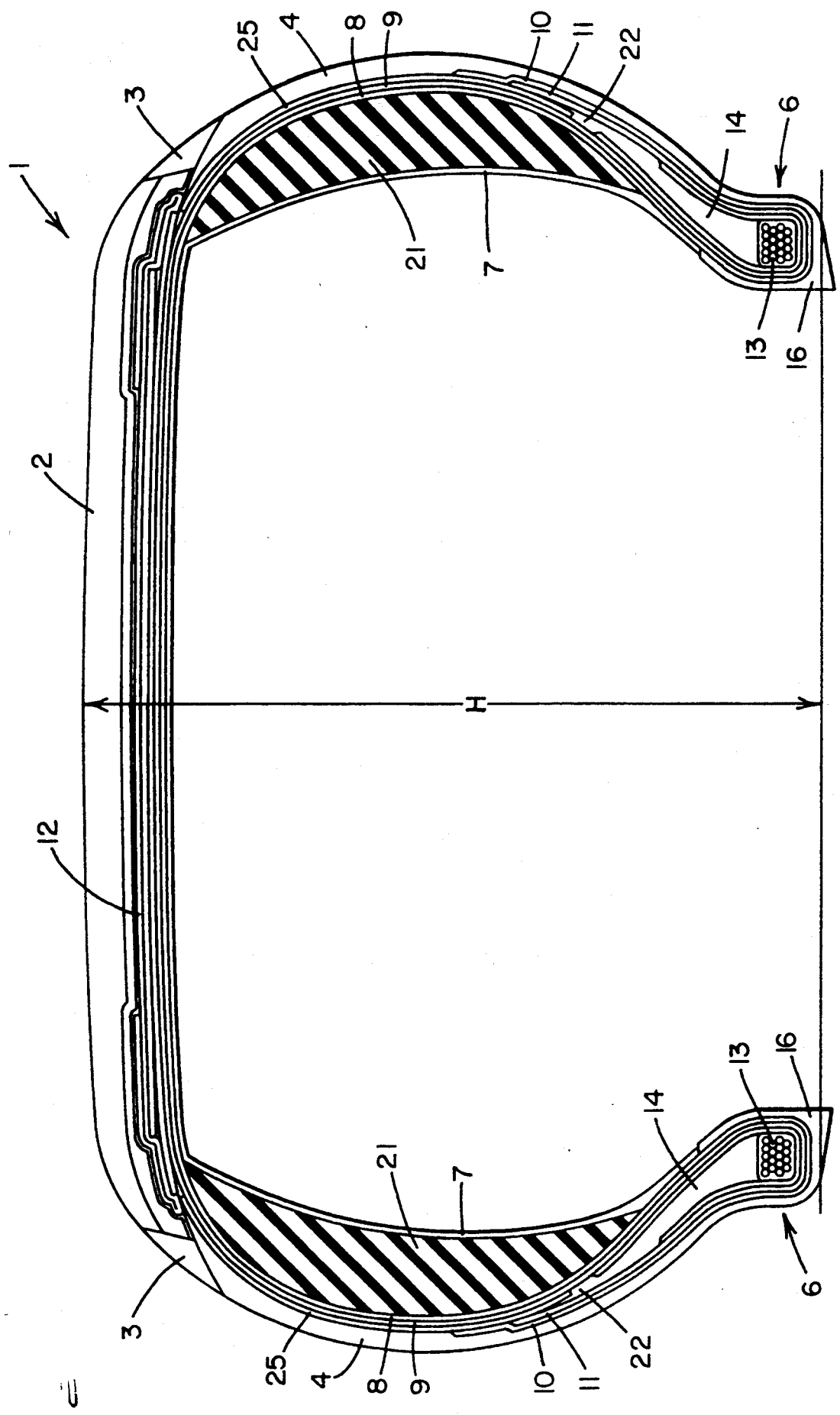

HIGH MODULUS LOW HYSTERESIS RUBBER COMPOUND FOR PNEUMATIC TIRES

This application is a continuation of Ser. No. 07/680,497 filed Apr. 4, 1991, now abandoned.

TECHNICAL FIELD

This invention relates to a novel vulcanizable rubber compound having high modulus and low hysteresis. Such compounds can be utilized in various components of pneumatic tires and particularly in pneumatic safety tires which have a wall stiffness such that when the tire is punctured during running, the tire can bear the load of the vehicle to allow for continued high speeds for a relatively long distance until the proper repair or tire replacement can be made. More particularly, compounds of the present invention can be employed in components of safety tires having a high profile with a section height of at least 5 inches. One such tire component is a sidewall insert. The compounds of the present invention comprise many ingredients that are currently commercially available.

BACKGROUND OF THE INVENTION

Various tire constructions have been devised over the years which enable a tire to run in an underinflated or non-inflated condition, such as after receiving a puncture and loss of air, for extended periods of time and at relatively high speeds, to enable the vehicle operator to safely drive the vehicle to an appropriate location for repair or replacement of the punctured tire. Certain of these safety sires, referred to as "run flat tires", have been successful for certain applications and certain types of tires constructions. Most of these run flat tires achieve the run flat property by the placement of reinforcing layers or members of relatively stiff elastomeric material in the sidewalls of the tire which enable the tire to support the vehicle weight even with the complete loss of internal air pressure.

Examples of various prior art run flat tire constructions are set forth in the following patents:

U.S. Pat. No. 3,911,987 discloses a low profile motorcycle tire which has an elastomeric internal reinforcement so that the tire stays inflated for a short duration with little or no air pressure. The reinforcing layer has a Shore A hardness of at least 45, preferably within the range of 60 to 90, and is positioned either outwardly of two tire body carcass plies or within the two carcass plies. This elastic reinforcement is constructed with varying thicknesses, and is cross-sectioned to eliminate abrupt changes of effective hardness of the sidewall and reinforcing layer.

U.S. Pat. No. 3,949,798 discloses another run flat tire construction for a low profile tire having reinforcing rubber insert strips located between the inner strips located between the inner liner and body ply carcass of the tire sidewall.

U.S. Pat. No. 3,954,131 discloses a safety tire which has elastomeric internal reinforcements in the sidewalls to allow the tire to be used for short durations with little or no air pressure within the tire. The elastomeric side reinforcements are of various thicknesses and are positioned outwardly of the tire carcass.

U.S. Pat. No. 4,067,372 discloses a pneumatic radial tire having internal reinforcements in its sidewalls which are formed of hard rubber and are used in combination with the body carcass plies and tire bead rubber inserts to give additional stiffness to the supple portions of the tire. The body carcass plies are located outwardly of the rubber inserts and are made from several cord fabric radial plies, and extend completely to the bead area of the tire.

U.S. Pat. No. 4,202,393 discloses a low profile motorcycle tire that has sidewall reinforcements to allow for a run flat condition in which the reinforcements are composed of an elastic filler with a reinforcing ply position completely around the elastic filler.

U.S. Pat. No. 4,203,481 discloses a run flat tire construction having reinforcing inserts made from a high modulus, low hysteresis rubber compound, which are located inwardly of the reinforcing carcass plies of the tire.

U.S. Pat. No. 4,261,405 shows another run flat tire construction for a low profile tire having a specially constructed rubber insert mounted between the innerliner and body ply carcass in the sidewall of the tire, in order to achieve the required rigidity for supporting the vehicle in an uninflated condition.

U.S. Pat. No. 4,287,924 discloses another run flat safety tire with sidewall reinforcing members. These members are comprised of two components, one of which is more flexible than the other, having a hardness rating greater than 70 and the other having a hardness rating of between 80 and 95. These reinforcing members are encased in the carcass plies of the tire and have a heat conducting layer positioned between the two components of the supporting members to alleviate heating problems in the thickest portions of the supporting members.

U.S. Pat. No. 4,365,659 discloses a run flat safety tire which has sidewall reinforcements made from low heat build up rubber which are positioned between an inner protective layer and the outer carcass plies of the tire.

U.S. Pat. No. 4,917,164 discloses the use of crescent-shaped reinforcing layers in the sidewalls of the tire to allow the tire to run for short durations with little or no air pressure. The reinforcing layers are of varying thickness and have a Shore A hardness of between 65 and 85, and are positioned between the innerliner and carcass plies of the tire. The wall thickness of the reinforcing members is between 1 and 12 millimeters.

Although many of these run flat tire constructions set forth in the above-referenced patents, have proved to be successful for certain applications, all of these constructions pertain to low profile tires, that is a tire having a section height less than 5 inches and are of the type usually found on high performance vehicles or motorcycles, and rely almost entirely on the stiffness of the elastomeric insert to provide the support for the uninflated tire. Furthermore, these high performance tires and motorcycle tires carry relatively smaller loads when compared to the higher weights carried by the larger cars using the higher section height tires.

Heretofore, providing a run flat tire for a high profile tire construction, that is a tire having a section height of 5 inches or greater, has not proved successful due to the relatively large sidewall reinforcement members which would be required to adequately support the tire in an uninflated condition to enable the tire to run for a relatively long distance at a high rate of speed. The relatively large rubber inserts which would be required would increase the weight of the tire to an unacceptable limit and would materially detract from the ride characteristic of the tire. If the amount of the material or type of material in these relatively large sidewall inserts were reduced or changed in order to lessen the weight of the tire and improve the ride characteristics for high section height tires, excessive heat would be generated within the inserts during a run flat condition, resulting in the rapid destruction of the tire, preventing the desired run flat conditions from being achieved at usual highway speeds for satisfactory use on such tires on most passenger vehicles.

Moreover, a vulcanizable rubber compound having sufficiently high modulus for use in various components of a pneumatic tire, to allow the resulting tire to have run flat characteristics, is not described in the foregoing art. Thus, the need has existed for a rubber compound for use as components such as sidewall inserts in a pneumatic safety tire or run flat tire, particularly for high profile tires, that is a tire having a section height of 5 inches or greater, which heretofore has not been achieved by the use of known rubber compounds.

SUMMARY OF THE INVENTION

Thus, it is an object of the present invention to provide a vulcanizable rubber compound that possess high modulus, low hystereses and a particular Shore A hardness range.

It is another object to provide a vulcanizable rubber compound as above that can be employed to manufacture components of pneumatic tires which have run flat characteristics.

It is yet another object of the present invention to provide a vulcanizable rubber compound as above that can be employed to manufacture components of pneumatic tires having a section height of 5 inches or greater.

It is still another object of the present invention to provide a vulcanizable rubber compound that is useful to manufacture components of pneumatic tires including sidewall inserts, bead filler material, high speed insert material and the like.

It is yet another object of the present invention to provide a vulcanizable rubber compound having high modulus, low hysteresis and sufficient stiffness to be useful in the construction of pnenumatic tires and provide the necessary reinforcing effect required to support the vehicle in a run flat condition.

At least one or more of the foregoing objects, together with the advantages thereof over known rubber compounds and the use thereof in pneumatic fires which shall become apparent from the specification which follows, are accomplished by the invention as hereinafter described and claimed.

In general, the present invention pertains to a sulfur-vulcanizable rubber compound having high modulus and low hysteresis comprising from about 0 to 65 parts by weight of polyisoprene; from about 25 to 35 parts by weight of a high styrene resin, SBR masterbatch and from about 0 to 65 parts by weight of polybutadiene to total 100 parts by weight; from about 50 to 60 parts by weight of a reinforcing filler, per 100 parts of rubber and at least 5 parts by weight of sulfur, per 100 parts by weight of rubber.

The present invention also provides a component for a pneumatic tire comprising a high modulus, low hysteresis vulcanizable rubber compound comprising from about 0 to 65 parts by weight of polyisoprene; from about 25 to 35 parts by weight of a high styrene resin, SBR masterbatch and from about 0 to 65 parts by weight of polybutadiene to total 100 parts by weight; from about 50 to 60 parts by weight of a reinforcing filler, per 100 parts by weight of rubber and at least 5 parts by weight of sulfur, per 100 parts by weight of rubber.

Finally, the present invention provides a pneumatic tire having run flat properties imparted by at least one component comprising a high modulus, low hysteresis vulcanizable rubber compound comprising from about 0 to 65 parts by weight of polyisoprene; from about 25 to 35 parts by weight of a high styrene resin, SBR masterbatch and from about 0 to 65 parts by weight of polybutadiene to total 100 parts by weight; from about 50 to 60 parts by weight of a reinforcing filler, per 100 parts by weight of rubber and at least 5 parts by weight of sulfur, per 100 parts by weight of rubber.

BRIEF DESCRIPTION OF THE DRAWING

The drawing figure provides a cross-sectional view of a tire construction designed for run flat operation.

PREFERRED MODE FOR CARRYING OUT THE INVENTION

As noted hereinabove the present invention is directed toward vulcanizable rubber compounds having high modulus, low hysteresis and a specific hardness range to have utility in the manufacture of pneumatic tires, particularly safety tires possessing run flat characteristics. Physical properties that are necessary for the components of a run flat tire and that are possessed by the compounds of the present invention include stiffness, low heat build up and good resistance to heat. Stiffness, which is determined by high modulus and high hardness, is necessary to minimize sidewall displacement in run flat, or underinflated, conditions. Low heat build up is attributed to low hysteresis compounds which are cooler running and increase the life of the tire operating under run flat conditions. Finally, good heat resistance is also necessary to increase the life of the tire operating under run flat conditions. For good heat resistance it is necessary that the compound possess good aging and reversion resistance properties.

Rubber compounds, according to the present invention comprise a blend of three elastomeric polymers: polyisoprene, natural or synthetic, with natural being preferred; a high styrene resin, SBR (styrene butadiene rubber) masterbatch; and, elastomeric polybutadiene. The high styrene resin, SBR masterbatch provides the high modulus and high hardness properties. Such resin masterbatches are emulsion masterbatches and comprise from about 40 to 48 percent by weight of emulsion SBR and from 60 to 52 percent by weight high styrene resin, with a total weight of available styrene in the resin masterbatch product ranging between about 56 to 60 percent by weight. These materials are available from Ameripol Synpol Company, a division of the Uniroyal Goodrich Tire Company, as tradenames 1903 and 1904. The 1903 material comprises 48 percent by weight SBR 1502 (BR Tg about $-100°$ C., styrene Tg about $+100°$ C.) and 52 percent by weight high styrene resin (Tg about $+100°$ C.) with 56 percent by weight total available styrene in the product. The 1904 material comprises 40 percent by weight SBR 1502 (BR Tg about $-100°$ C., styrene Tg about $+100°$ C.) and 60 percent by weight high styrene resin (Tg about $+100°$ C.) with 60 percent by weight total available styrene in the product.

The low hysteresis and low heat build up properties of the compounds of this invention are attributable to the polybutadiene rubber, which provides low hysteresis and low compression set, and the polyisoprene which provides low hysteresis and high tensile strength. Suitable polybutadiene rubber is elastomeric and has a 1,2- (vinyl) content of about 1 to 3 percent and cis-1,4 content of about 96 to 98 percent. Other high vinyl butadiene rubbers, having up to about 12 percent 1,2- content, may also be suitable with an adjustment in the high styrene SBR masterbatch level and thus, substantially any high vinyl, elastomeric polybutadiene can be employed.

The compounds of the present invention comprise from about 0 to 65 parts by weight of polyisoprene; from about 25 to 35 parts by weight of high styrene resin, SBR masterbatch and, from about 0 to 65 parts by weight of polybutadiene rubber, to total 100 parts by weight of rubber (phr). Additionally the compounds of the present invention comprise from about 50 to 60 phr of carbon black as a low hysteresis filler material. Particularly useful is FEF (fast extrusion furnace) black, a relatively high structure and large particle size carbon black. Further discussions of such carbon blacks can be found in the literature. See, for example, *The Vanderbilt Rubber Handbook*, pp 408–424, RT Vanderbilt Co., Norwalk, Conn. 06855 (1979). The compounds are cured by sulfur, rather than peroxides and thus, sulfur or a sulfur donor is required. Minimally, at least 5 phr of sulfur, or an equivalent amount of donor, is added to provide high modulus. Conventional accelerators are also employed to provide fast modulus generation during cure. Also, from about 1–2 phr of an antioxidant and of an antiozonant of conventional types, are employed in the usual amounts to contribute good heat resistance.

Regarding physical properties of the rubber compounds of the present invention, a mechanical modulus of from about 1800 psi to 4000 psi would be suitable, the preferred range being between about 2600 psi and 2800 psi, with approximately 2700 psi being most preferred. These moduli are at the run flat operating condition (0 psi inflation) and are measured in the 15% strain range. The hardness range should be within from about 80 and 97 on the Shore A hardness scale, at 23° C., the preferred range being between about 85 and 91, with 88 being most preferred. Likewise, the hysteresis when measured at 100° C. at 10 Hertz and 7 percent deflection, has a Tan Delta (δ) of between 0.03 and 0.20, with the preferred range falling between 0.03 and 0.11 and most preferably, between 0.03 and 0.07.

As an example of a high modulus, low hysteresis, hard vulcanizable rubber compound according to the present invention a formulation has been provided in Table I, as Compound 1. The high styrene resin, SBR masterbatch is designated as High styrene/SBR in Table I. All non-rubber parts are presented on the basis of parts by weight per hundred rubber by weight (phr). To the fight of compound 1, Table I lists a range of suitable amounts for each component. The compounds of the present invention can contain conventional antioxidants, antiozonants and accelerators, as is shown for Compound 1. It is to be understood that such components are well known to those skilled in the art and thus, the present invention is not limited to the use of any particular antioxidants, antiozonants or accelerators, or amounts thereof. Similarly, practice of the present invention is also not limited to the specific formulation of Compound 1.

TABLE I

High Modulus, Low Hysteresis, Hard Vulcanizable Rubber Compound

| | COMPOUND 1 | RANGES |
|---|---|---|
| Natural rubber | 25.0 | 0–65 |
| High Styrene/SBR | 35.0 | 25–35 |
| Polybutadiene | 40.0 | 0–65 |
| FEF carbon black | 50.0 | 50–60 |
| Zinc oxide | 5.0 | 3–5 |
| Stearic acid | 1.0 | 1 |
| Naphthenic oil | 2.5 | 2–4 |
| Antioxidant[a] | 2.0 | 1–2 |
| Antiozonant[b] | 1.0 | 1–2 |
| Sulfur | 6.0 | 5–8 |
| Accelerator[c] | 1.5 | 1–2 |
| Accelerator[d] | 1.0 | 0–1 |

[a] 1,2-dihydro-2,2,4-trimethylquinoline (TMQ)
[b] N'-phenyl-p-phenylene diamine
[c] 2-(morpholinothio)benzothiazolesulfenamide (MBS)
[d] tetramethylthiuram monosulfide (TMTM)

Compound 1 was subjected to cure at 149° C. for 40 minutes following which physical properties were measured and are reported in Table II.

TABLE II

| Physical Properties of Compound 1 | |
|---|---|
| Modulus (unaged) | |
| tensile (psi) | 1863 |
| % elongation (at break) | 66.79 |
| Modulus (aged) | |
| tensile (psi) | 2158 |
| % elongation (at break) | 66.79 |
| Modulus (low extension) (psi) | |
| 1% | 42.0 |
| 5% | 155.0 |
| 10% | 256.0 |
| Durometer Shore A | |
| 23° C. | 86 |
| 66° C. | 82 |
| MTS Tan δ | |
| (100° C., 10Hz, 7% def) | 0.07 |
| (23° C., 10Hz, 7% def) | 0.16 |
| (66° C., 10Hz, 7% def) | 0.18 |
| Pendulum rebound | |
| 23° C. | 60 |
| 66° C. | 62 |
| Dynamic modulus | |
| 150° C. 10Hz | $4.3 \times 10^7$ dyne/cm$^2$ |

From the results reported in Table II, it is apparent that the rubber compound of the present invention provided high modulus, low hysteresis and a relatively high Shore A hardness.

As noted hereinabove, the rubber compounds of the present invention can be employed to manufacture components of pneumatic tires. With reference to the drawing figure, a tire cross-section has been presented, depicting typical components of a high profile pneumatic tire. The tire referred to generally by the numeral 1, includes a tread portion 2 terminating in a pair of tread shoulders 3 adjacent a pair of sidewalls 4, which extend radially from the axial outer shoulders 3 to a pair of bead portions indicated generally at 6. As in a typical pneumatic tire, the interior of the tire includes an innerliner 7 formed of a high air impervious material, in combination with a pair of body plies 8 and 9 which form the carcass of the tire. Body plies 8 and 9 extend around bead portion 6 and terminate in turn-up ends 10 and 11 respectively. Each bead portion 6 consists of a usual annular bead wire 13 and a generally triangular-shaped bead filler 14. Abrasive gum strips 16 preferably are molded with the finished tire and are adapted to be located adjacent each flange of a wheel rim on which the tire is to be mounted.

Usual reinforcing belts of wire and/or fabric 12 are located between body carcass plies 8 and 9 and tread portion 2. These tire components are all contained within integrally formed inner and outer rubber casings which form the sidewalls of the tire. The tire section height is indicated at "H", and in accordance with the objects of the present invention, a height of at least 5 inches or greater is contemplated, referred to herein as a high profile tire. In passenger tire nomenclature, such as P 225/60 R 16, the number 225 represents the section width of the tire in millimeters; 16 represents the tire diameter in inches, and 60 represents the ratio in percentage of the tire section height with respect to the section width. Thus far, the above-referenced tire construction is illustrative of a general pneumatic tire construction which can vary.

Additionally the tire depicted in the drawing includes several new components which assist in providing a high profile, pneumatic safety tire. One of these is the sidewall insert which comprises a pair of generally crescent-shaped elastomeric reinforcing members indicated at 21 which are mounted between innerliner 7 and body plies 8 and 9 and extend from adjacent tread shoulders 3 of tread portion 2 along the sidewall of the tire to a position generally adjacent the apex 22 of bead filler 14. Another component comprises a pair of biased reinforcing strips or plies 25, which are located between sidewalls 4 and body carcass plies 8 and 9, and elastomeric reinforcing members 21, the latter extending along the sidewall of the tire to a position below apex 22 of bead filler 14. For a more detailed description of such a tire construction, particularly designed for run flat operation as a safety tire, see co-pending application, U.S. Ser. No. 07/680,714 (now U.S. Pat. No. 5,217,549) owned by the Assignee of record herein, the subject matter of which is incorporated by reference.

The rubber compounds of the present invention have particular applicability to the sidewall inserts 21. Additionally, they can be employed in the bead filler 14. Of course, use of the compounds of the present invention is not limited solely to the manufacture of components for pneumatic tires, but can be utilized wherever a rubber compound having high modulus, low hysteresis and a relatively high Shore A hardness is desired, as will be apparent to those skilled in the art.

Regarding physical properties of the rubber compounds of the present invention, a mechanical modulus of from about 1800 psi to 4000 psi would be suitable, the preferred range being between about 2600 psi and 2800 psi with approximately 2700 psi being most preferred. These moduli are at the run flat operating condition and are measured in the 15% strain range. The hardness range should be within from about 80 and 97 on the Shore A hardness scale, the preferred range being between about 85 and 91 with 88 being most preferred. Likewise, the hysteresis when measured at 100° C. at 10 Hertz and 7% deflection, has a Tan $\delta$ of between 0.03 and 0.11 and most preferably 0.03 and 0.07.

In conclusion, it should be clear from the foregoing example and specification disclosure that the compounds of the present invention have improved physical properties which can, in turn, improve the run flat performance of pneumatic tires when used to make components incorporated therein. It is to be understood that practice of the present invention is not limited to the natural rubber formulation containing of Compound 1 exemplified herein or by the disclosure of typical rubber polymers provided herein, and that the example has been provided merely to demonstrate practice of the subject invention. Those skilled in the art may readily select and formulate other high modulus, low hysteresis rubber compounds according to the disclosure made hereinabove.

Moreover, as noted hereinabove, the present invention should not be limited to the use of such rubber compounds as sidewall inserts for pneumatic tires or even to components of pneumatic tires per se. Thus, it is believed that any of the variables disclosed herein can readily be determined and controlled without departing from the scope of the invention herein disclosed and described. Moreover, the scope of the invention shall include all modifications and variations that fall within the scope of the attached claims.

I claim:

1. A sulfur-vulcanizable rubber compound having high modulus and low hysteresis consisting essentially of:
   a blend of
      from about 0 to 65 parts by weight of polyisoprene;
      from about 25 to 35 parts by weight of a masterbatch comprising emulsion SBR and high styrene resin, providing a total weight of available styrene in said masterbatch of greater than 40 percent by weight; and
      from about 0 to 65 parts by weight of polybutadiene to total 100 parts by weight;
   from about 50 to 60 parts by weight of a reinforcing filler, per 100 parts by weight of rubber; and
   at least 5 parts by weight of sulfur, per 100 parts by weight of rubber;
   said compound having a Tan $\delta$ of less than 0.2, measured at 100° C., 7% deflection and 10 Hz.

2. A sulfur-vulcanizable rubber compound, as set forth in claim 1, wherein said mechanical modulus ranges from about 1800 to 4000 psi in the 15% strain range.

3. A sulfur-vulcanizable rubber compound, as set forth in claim 1, having a Tan $\delta$ of from about 0.03 and 0.20, measured at 100° C., 7% deflection and 10 Hz.

4. A sulfur-vulcanizable rubber compound, as set forth in claim 1, having a Shore A hardness of from about 80 to 97.

5. A sulfur-vulcanizable rubber compound having high modulus and low hysteresis consisting essentially of:
   about 25 parts by weight of polyisoprene;
   about 35 parts by weight of a masterbatch comprising emulsion SBR and high styrene resin, providing a total weight of available styrene in said masterbatch of greater than 40 percent by weight; and
   about 40 parts by weight of polybutadiene to total 100 parts by weight;
   about 50 parts by weight of a reinforcing filler, per 100 parts by weight of rubber; and
   at least 5 parts by weight of sulfur, per 100 parts by weight of rubber;
   said compound having a Tan $\delta$ of less than 0.2 measured at 100° C., 7% deflection and 10 Hz.

6. A sulfur-vulcanizable rubber compound, as set forth in claim 5, wherein said reinforcing filler comprises carbon black.

7. A sulfur-vulcanizable rubber compound, as set forth in claim 6, further comprising 6 parts by weight of sulfur, per 100 parts of rubber.

8. A sidewall insert for a pneumatic tire comprising a high modulus, low hysteresis vulcanizable rubber compound consisting essentially of:
  a blend of
    from about 0 to 65 parts by weight of polyisoprene;
    from about 25 to 35 parts by weight of a masterbatch comprising emulsion SBR and high styrene resin, providing a total weight of available styrene in said masterbatch of greater than 40 percent by weight; and
    from about 0 to 65 parts by weight of polybutadiene to total 100 parts by weight;
  from about 50 to 60 parts by weight of a reinforcing filler, per 100 parts by weight of rubber; and
  at least 5 parts by weight of sulfur, per 100 parts by weight of rubber;
  said compound having a Tan δ of less than 0.2 measured at 100° C., 7% deflection and 10 Hz.

9. A sidewall insert for a pneumatic tire, as set forth in claim 8, wherein the mechanical modulus of said rubber compound ranges from about 1800 to 4000 psi in the 15% strain range.

10. A sidewall insert for a pneumatic tire, as set forth in claim 8, wherein the Tan δ of said rubber compound ranges from about 0.03 and 0.20, measured at 100° C., 7% deflection and 10 Hz.

11. A sidewall insert for a pneumatic tire, as set forth in claim 8, wherein the Shore A hardness of said rubber compound ranges from about 80 to 97.

12. A sidewall insert for a pneumatic tire comprising a high modulus, low hysteresis vulcanizable rubber compound consisting essentially of:
  about 25 parts by weight of polyisoprene;
  about 35 parts by weight of a masterbatch comprising emulsion SBR and high styrene resin, providing a total weight of available styrene in said masterbatch of greater than 40 percent by weight; and
  about 40 parts by weight of polybutadiene to total 100 parts by weight;
  about 50 parts by weight of a reinforcing filler, per 100 parts by weight of rubber; and
  at least 5 parts by weight of sulfur, per 100 parts by weight of rubber;
  said compound having a Tan δ of less than 0.2 measured at 100° C., 7% deflection and 10 Hz.

13. A sidewall insert for a pneumatic tire, as set forth in claim 12, wherein said reinforcing filler comprises carbon black.

14. A sidewall insert for a pneumatic tire, as set forth in claim 13, further comprising 6 parts by weight of sulfur, per 100 parts by weight of rubber.

15. A pneumatic tire having run flat properties imparted by at least one of a sidewall insert and a bead filler for a pneumatic tire, the component imparting run flat properties comprising a high modulus, low hysteresis vulcanizable rubber compound consisting essentially of:
  a blend of
    from about 0 to 65 parts by weight of polyisoprene;
    from about 25 to 35 parts by weight of a masterbatch comprising emulsion SBR and high styrene resin, providing a total weight of available styrene in said masterbatch of greater than 40 percent by weight; and
    from about 0 to 65 parts by weight of polybutadiene to total 100 parts by weight;
  from about 50 to 60 parts by weight of a reinforcing filler, per 100 parts by weight of rubber; and
  at least 5 parts by weight of sulfur, per 100 parts by weight of rubber;
  said compound having a Tan δ of less than 0.2 measured at 100° C., 7% deflection and 10 Hz.

16. A pneumatic tire, as set forth in claim 15, wherein said mechanical modulus of said rubber compound ranges from about 1800 to 4000 psi in the 15% strain range.

17. A pneumatic tire, as set forth in claim 15, wherein the Tan δ of said rubber compound ranges from about 0.03 and 0.20, measured at 100° C., 7% deflection and 10 Hz.

18. A pneumatic tire, as set forth in claim 15, wherein the Shore A hardness of said rubber compound from about 80 to 97.

19. A pneumatic tire having run flat properties imparted by at least one of a sidewall insert and a bead filler, the component imparting run flat properties comprising a high modulus, low hysteresis vulcanizable rubber compound consisting essentially of:
  about 25 parts by weight of polyisoprene;
  about 35 parts by weight of a masterbatch comprising emulsion SBR and high styrene resin, providing a total weight of available styrene in said masterbatch of greater than 40 percent by weight; and
  about 40 parts by weight of polybutadiene to total 100 parts by weight;
  about 50 parts by weight of a reinforcing filler, per 100 parts by weight of rubber; and
  at least 5 parts by weight of sulfur, per 100 parts by weight of rubber;
  said compound having a Tan δ of less than 0.2 measured at 100° C., 7% deflection and 10 Hz.

20. A pneumatic tire, as set forth in claim 19, wherein said reinforcing filler comprises carbon black.

21. A pneumatic tire, as set forth in claim 20, further comprising 6 parts by weight of sulfur, per 100 parts of rubber.

22. A sulfur-vulcanizable rubber compound having high modulus and low hysteresis consisting essentially of:
  a blend of
    from about 1 to 64 parts by weight of polyisoprene;
    from about 25 to 35 parts by weight of a masterbatch comprising emulsion SBR and high styrene resin, providing a total weight of available styrene in said masterbatch of greater than 40 percent by weight; and
    from about 1 to 64 parts by weight of polybutadiene to total 100 parts by weight;
  from about 50 to 60 parts by weight of a reinforcing filler, per 100 parts by weight of rubber; and
  at least 5 parts by weight of sulfur, per 100 parts by weight of rubber;
  said compound having a Tan δ of less than 0.2 measured at 100° C., 7% deflection and 10 Hz and a mechanical modulus of from about 1800 to 4000 psi in the 15% strain range.

23. A bead filler for a pneumatic tire comprising a high modulus, low hysteresis vulcanizable rubber compound consisting essentially of:
  a blend of
    from about 0 to 65 parts by weight of polyisoprene;
    from about 25 to 35 parts by weight of a masterbatch comprising emulsion SBR and high styrene resin, providing a total weight of available styrene in said masterbatch of greater than 40 percent by weight; and from about 0 to 65 parts by weight of polybutadiene to total 100 parts by weight;
from about 50 to 60 parts by weight of a reinforcing filler, per 100 parts by weight of rubber; and
at least 5 parts by weight of sulfur, per 100 parts by weight of rubber;
said compound having a Tan δ of less than 0.2 measured at 100° C., 7% deflection and 10 Hz.

24. A bead filler for a pneumatic tire, as set forth in claim 23, wherein the mechanical modulus of said rubber compound ranges from about 1800 to 4000 psi in the 15% strain range.

25. A bead filler for a pneumatic fire, as set forth in claim 23, wherein the Shore A hardness of said rubber compound ranges from about 80 to 97.

26. A bead filler for a pneumatic tire comprising a high modulus, low hysteresis vulcanizable rubber compound consisting essentially of:
about 25 parts by weight of polyisoprene;
about 35 parts by weight of a masterbatch comprising emulsion SBR and high styrene resin, providing a total weight of available styrene in said masterbatch of greater than 40 percent by weight; and
about 40 parts by weight of polybutadiene to total 100 parts by weight;
about 50 parts by weight of a reinforcing filler, per 100 parts by weight of rubber; and
at least 5 parts by weight of sulfur, per 100 parts by weight of rubber;
said compound having a Tan δ of less than 0.2 measured at 100° C., 7% deflection and 10 Hz.

27. A bead filler, as set forth in claim 26, wherein said reinforcing filler comprises carbon black.

28. A bead filler, as set forth in claim 26, further comprising 6 parts by weight of sulfur, per 100 parts by weight of rubber.

29. A bead filler for a pneumatic tire, as set forth in claim 23, wherein said masterbatch comprises from about 40 to 48 percent by weight of said SBR and from 60 to 52 percent by weight of said high styrene resin.

30. A bead filler for a pneumatic tire, as set forth in claim 23, wherein the Tan δ of said rubber compound ranges from about 0.03 to 0.20, measured at 100° C. 7% deflection and 10 Hz.

31. A sulfur-vulcanizable rubber compound, as set forth in claim 1, wherein said masterbatch comprises from about 40 to 48 percent by weight of said SBR and from 60 to 52 percent by weight of said high styrene resin.

32. A sidewall insert for a pneumatic tire, as set forth in claim 8, wherein said masterbatch comprises from about 40 to 48 percent by weight of said SBR and from 60 to 52 percent by weight of said high styrene resin.

33. A pneumatic tire, as set forth in claim 15, wherein said masterbatch comprises from about 40 to 48 percent by weight of said SBR and from 60 to 52 percent by weight of said high styrene resin.

* * * * *